Figure 1:
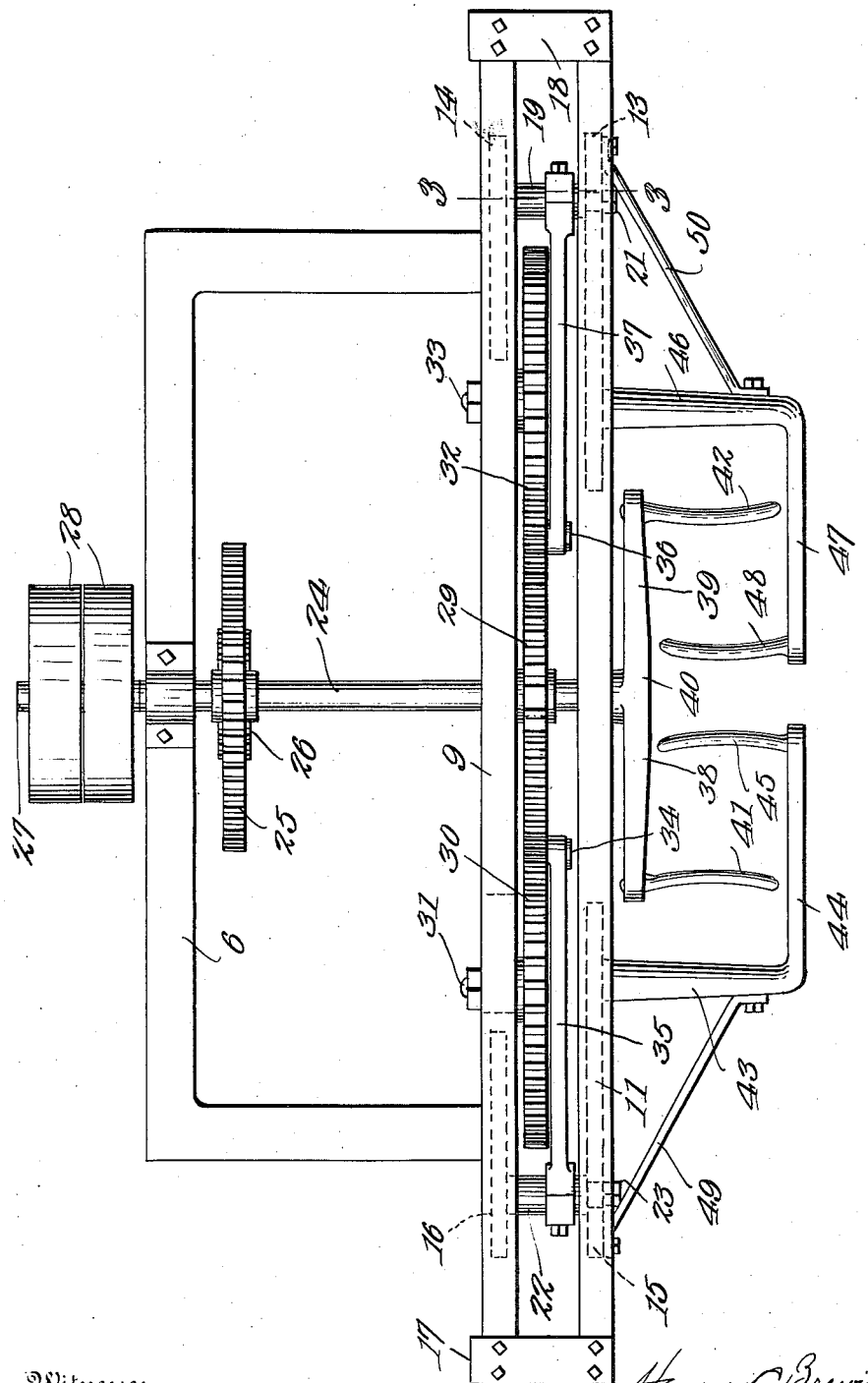

H. S. BREWINGTON.
CANDY PULLING MACHINE.
APPLICATION FILED FEB. 24, 1914.

1,130,683.

Patented Mar. 2, 1915.
3 SHEETS—SHEET 1.

Witnesses
J. B. Wooden.
R. E. Preece.

Inventor
Henry S. Brewington,
By E. Walton Brewington,
Attorney

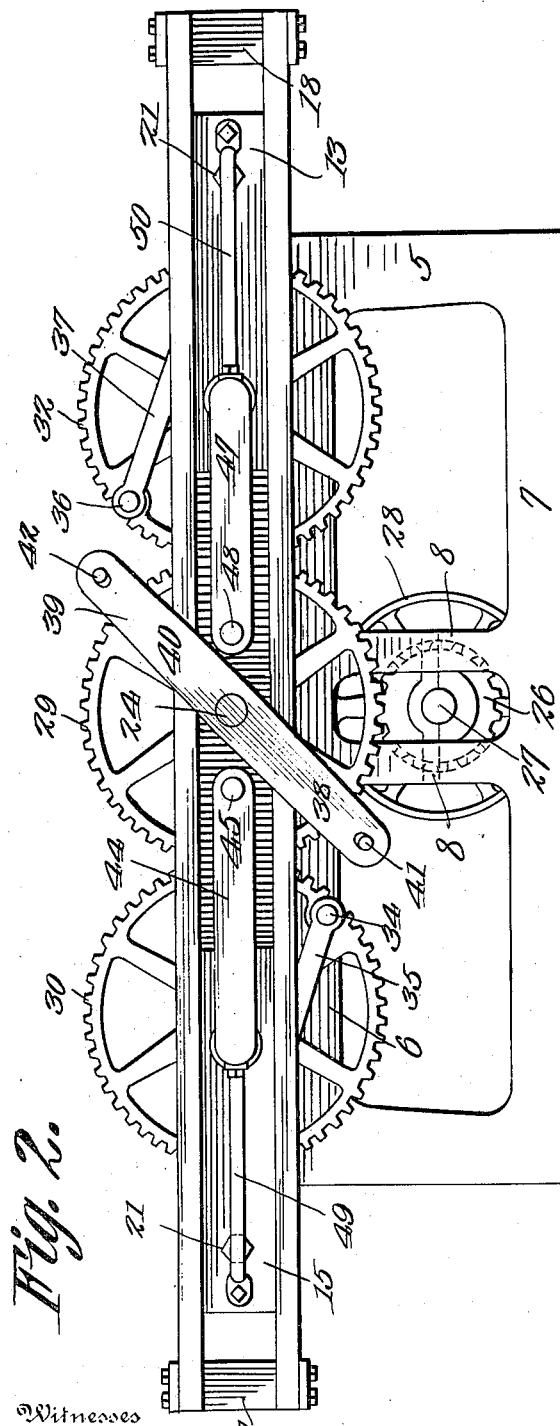

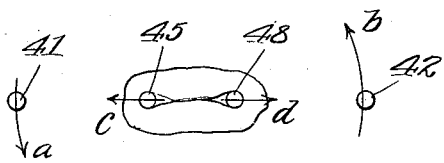
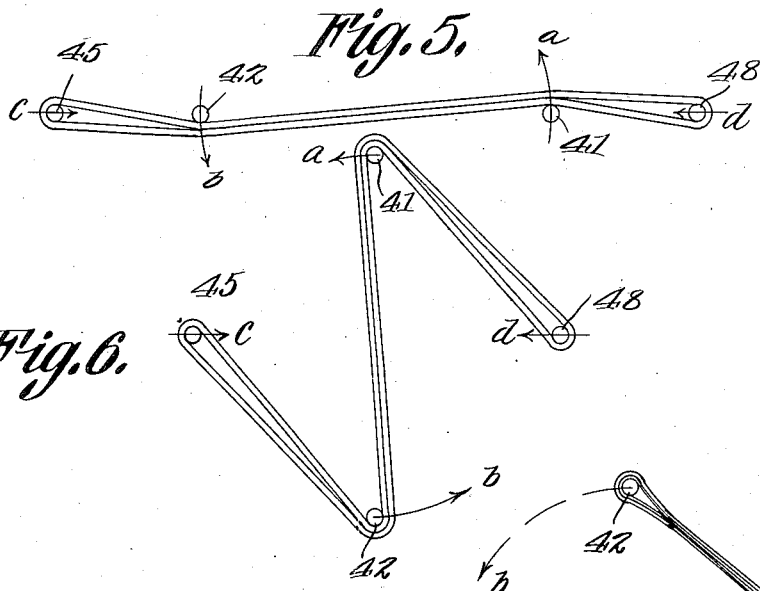
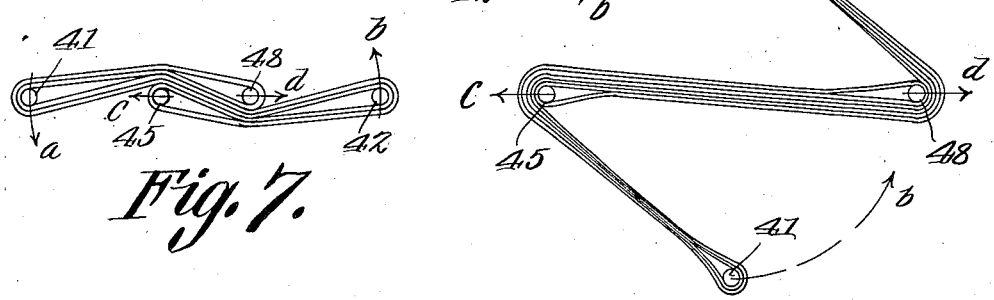

UNITED STATES PATENT OFFICE.

HENRY S. BREWINGTON, OF BALTIMORE, MARYLAND, ASSIGNOR OF ONE-THIRD TO CHARLES G. GUTH AND ONE-THIRD TO RICHARD B. TIPPETT, BOTH OF BALTIMORE, MARYLAND.

CANDY-PULLING MACHINE.

1,130,683.          Specification of Letters Patent.          Patented Mar. 2, 1915.

Application filed February 24, 1914. Serial No. 820,449.

*To all whom it may concern:*

Be it known that I, HENRY S. BREWINGTON, a citizen of the United States, residing at Baltimore city, State of Maryland, have invented certain new and useful Improvements in Candy-Pulling Machines, of which the following is a specification.

This invention relates to machines for pulling candy and has for its general object to simplify and cheapen the construction of such machines and at the same time facilitate their operation and increase their capacity.

With this object in view the invention consists in the improved construction, arrangement and combination of the parts of a machine of this character, which will be hereinafter described and afterward specifically claimed.

In order that the construction and operation thereof may be readily comprehended, I have illustrated an approved embodiment of my invention in the accompanying drawings and will now proceed to fully describe the invention in connection with said drawings in which—

Figure 1 represents a top plan view, Fig. 2, a view in side elevation, the double crank arm carrying the pulling pins or arms being at an angle of 45 degrees from its position in Fig. 1, and Fig. 3, a sectional view on the transverse vertical plane indicated by the broken line 3—3 in Fig. 1, Figs. 4 to 8 represent diagrammatically the operation of the rotating and sliding pins upon the candy, Fig. 4, showing the batch of candy placed upon the sliding pins with the parts in the position of Fig. 1, Fig. 5, the condition of the candy after a half revolution of the pins, Fig. 6, the condition of the candy after a quarter revolution from the position of Fig. 5, Fig. 7, the condition of the candy after a quarter revolution from the position of Fig. 6, and Fig. 8, the condition of the candy after a quarter revolution from the position of Fig. 7.

Like reference characters indicate the same parts in all of the figures of the drawings.

Referring specifically to the drawings 5, 5, indicate the standards of a frame work of any suitable form to support the working parts of the machine, said standards being connected at their upper ends by horizontal bars 6, which form the top of the frame work, such construction being suitable for the purposes of this invention, although many other forms of frame work might be used. Longitudinal bars 7 connect the standards 5 below the top, and these longitudinal bars are connected to the bars 6 by any suitable skeleton frame work, such for instance as the upright bars 8.

Mounted on one side of the frame work of the machine are two slideways, one consisting, in this instance, of channel bars 9 and 10 and the other of channel bars 11 and 12, the slideways being parallel with each other and each serving as a guide for a slide bar as at 13 and 14, the upper edges of said slide bars fitting in the channels in the under faces of the channel bars 9 and 11 and the lower edges in the channels in the upper faces of the channel bars 10 and 12.

The slideways extend beyond the frame at each end and the slide bars 13 and 14 just described are at the right hand end of the machine, see Fig. 1. Similar slide bars 15 and 16 are similarly located in the slideways at the left hand end of the machine, see Fig. 1, the channel bars being spaced apart and parallel with each other and secured in their spaced relation by cross bars 17 and 18 bolted or otherwise connected together, and the slide bars properly spaced apart by means of a bar 19 having reduced ends which are passed through the slide bars and secured therein by any suitable means such as bolts and nuts 20 and 21. A similarly shaped cross bar 22 connects together and spaces apart the slide bars 15 and 16, being secured by similar bolts or nuts 23.

Journaled in the frame of the machine is a transverse main shaft 24, which carries a gear wheel 25 which meshes with a pinion 26 on a drive shaft 27 journaled in the frame of the machine in any suitable manner and driven by any suitable power, as for instance, by power transmitted by a belt (not shown) engaging over fast and loose pulleys 28 on said drive shaft 27.

Between the slideways, on the shaft 24, is a gear wheel 29 which meshes with a gear wheel 30 also located between the slideways and mounted on a stub shaft 31 secured in the frame work, and also with a similar gear wheel 32 mounted on a stub shaft 33 secured in the frame work, the gear wheels 30 and 32 being located on opposite sides of the gear wheel 29.

On the gear wheel 30 is a crank pin 34 which is connected by a pitman 35 with the cross bar 22 which connects the slide bars 15 and 16 and on the gear wheel 32 is a similar crank pin 36 connected by a pitman 37 with the cross bar 19 which connects the slide bars 13 and 14.

The outer end of the shaft 24, in front of the slideways carries two crank arms 38 and 39 extending in opposite directions from the shaft, being shown in this instance as a T-shaped diametric bar 40 from the opposite ends of which project curved arms 41 and 42.

Projecting horizontally from the slide bar 15 is the transverse arm 43 of a bell crank bar, said transverse arm projecting laterally to a point beyond the outer end of the curved arm 41 and being provided at its end with the longitudinal arm 44 which extends, parallel with the length of the machine, to a point nearly, but not quite, in line with the shaft 24. At the extremity of this longitudinal arm 44 of the bell crank arm is secured an inwardly projecting curved arm or pin 45 which reaches nearly but not quite to the crank arms 38 and 39 which carry the curved arms or pins 41 and 42.

Projecting from the slide bar 13 is a transverse arm 46 on a similar bell crank arm, which extends to a point beyond the outer end of the curved pin or arm 42 on the crank arm 39 and which is provided with a longitudinal arm 47, similar to the arm 44, carrying at its outer end, an inwardly projecting curved arm or pin 48 similar in construction and extent to the curved arm 45 heretofore described.

The transverse arms 43 and 46 are stiffened by brace rods 49 and 50 the first secured at its inner end to the slide bar 15 and at its outer end to the transverse arm 43 and the second at its inner end to the slide bar 13 and at its outer end to the transverse arm 46. The longitudinal arms 44 and 47 are in exact alinement with each other in the same horizontal line which also brings the curved arms 45 and 48 in the same horizontal plane.

When the shaft 24 is rotated the crank arms 38 and 39 are also rotated and the pins or arms 41 and 42 carried around in the same fixed path. The rotation of the gear 29 with the shaft 24 causes the gears 30 and 32 to rotate in opposite directions, carrying around the crank pins 34 and 36, these gears being so adjusted with relation to each other that the pins 45 and 48 will both be in their extreme inner positions nearest the center of the machine, at the same time, and in horizontal alinement, and the pins 41 and 42 in horizontal alinement with each other and outside of and in horizontal alinement with the pins 45 and 48, as shown in Figs. 1, 4 and 7. This position of the parts is the position in which to place the candy in position to be pulled.

The operation of pulling the candy is fully illustrated, diagrammatically, in Figs. 4 to 8 and may be described as follows, prefacing the description by the statement that as the pins 41 and 42 are rotated continuously with the shaft 24 as an axis, the pins 45 and 48 are reciprocated longitudinally of the machine, in the horizontal plane of the shaft 24, or the center of the rotation of the pins 41 and 42, from the positions shown in Figs. 1, 4 and 7 to those illustrated in Fig. 5. To begin the operation, a batch of candy as at 51 in Fig. 4, is thrown around the pins 45 in their nearest approach to each other, fully encircling these two pins and forming, as it were, a loop around them. The machine is now started when the pins 41 and 42 will rotate continuously to the left, or in the direction indicated by the arrows $a$ and $b$, and the pins 45 and 48 reciprocate in the horizontal line indicated by the arrows $c$ and $d$. In the first half revolution of the shaft 24, and with it the pins 41 and 42, the pin 45 will be moved to the position shown at the left of Fig. 5 and pin 48 to the position shown at the right of Fig. 5, these being the extreme outward movements of these pins away from each other, and the loop of candy around these pins will be stretched to this limit. During this half revolution of the shaft 24, and the outward movement of the pins 45 and 48, the pin 41 will be carried around until, at the end of the half revolution, it contacts with the under side of the loop of candy at some distance inward from the pin 48, and the pin 42 will be carried around until, at the end of the half revolution, it will contact with the upper side of the loop of candy at some distance from the pin 45. In the next quarter revolution of the shaft 24 the pins 45 and 48 will move inward, toward each other, to positions, as illustrated in Fig. 6, midway between their positions as illustrated in Figs. 4 and 5. In the meantime the pins 41 and 42 will rotate from the positions of Fig. 5 to those of Fig. 6, the pin 41 moving upward and carrying the right hand part of the candy loop upward, while the pin 42 moves downward and carries the left hand part of the candy loop downward, thus stretching the candy loop to its extreme limit as shown in Fig. 6. The next quarter revolution of the pins 41 and 42 will carry these pins, and the pins 45 and 48, to the positions illustrated in Fig. 7 which are the positions also illustrated in Fig. 1, the first rotation being completed. During this quarter revolution, the pins 45 and 48 are moved inward and the double portion of the candy loop shown between the pins 41 and 42 in Fig. 6 is folded around said pins, that portion upward in Fig. 6 being carried down upon the top of pin 45 and that portion downward in Fig. 6, upward and against the under side of pin 48, as clearly shown in Fig. 7. The second revolution of the pins 41 and 42 with the shaft 24 now begins and the first quarter of this revolution will carry pins 41 and 42, and pins 45 and 48, to the positions shown in Fig. 8, in which the pins 41 and 42 are reversed in position from the positions shown in Fig. 6, and the pins 45 and 48 are in the same positions as in Fig. 6, but instead of having the simple double threads as it were, of the loop, as seen in Fig. 6, there are four threads or thicknesses of candy between pins 42 and 48, and between 41 and 45, and six threads or thicknesses between pins 45 and 48, which will illustrate the very great extent to which the candy will be stretched in the half revolution from the position of Fig. 6 to that of Fig. 8. The next quarter revolution will bring the pins to the positions of Fig. 5 while the succeeding quarter revolution will do the same folding of the doubled up candy as was done to the simple single loop between the positions of Figs. 5 and 6.

From the foregoing, it will be seen that the loop of candy placed around the pins 45 and 48 in the positions of Fig. 4, is first stretched, then doubled up, the doubled candy stretched, then the stretched doubled candy again doubled up and again stretched, and so on continuously, stretching and doubling, until the operation of pulling the candy is completed, the candy being maintained under tension during the whole operation.

I have illustrated and described specifically the construction, operation and location of the various parts of my invention, the rotating pins being shown as moving on a horizontal axis in a vertical plane, and the sliding pins as moving in a horizontal plane, but I do not limit the invention to these specific constructions and locations, as it will be obvious to those skilled in the art to which my invention most nearly appertains that many slight changes might be made therein, without departing from the spirit or scope of the invention, as hereinafter claimed, neither do I wish to be understood as limiting the invention to two sliding pins, as either one of these pins may be dispensed with and equally as good results attained by the use of a single sliding pin.

Having thus fully described my invention, what I claim as new and desire to secure by Letters Patent of the United States is:—

1. A candy pulling machine, comprising a pair of substantially parallel pins having a common axis, means for revolving said pins about said axis, a pair of pins substantially parallel with the revolving pins, and bodily slidable means for moving said pins in right lines diametrically opposite each other and radially to said axis and in the same plane with each other and with said axis and into and out of the path of movement of the revolving pins.

2. A candy pulling machine, comprising a pair of substantially horizontal pins having a common horizontal axis, means for revolving said pins about said axis, a pair of substantially parallel horizontal pins one on each side of said axis, and bodily slidable means for moving the last-named pins in right lines diametrically opposite each other and radially to said axis and in the same plane with each other and with said axis and toward and from said axis.

3. A candy pulling machine, comprising a pair of substantially parallel horizontal pins having a common horizontal axis, means for revolving said pins about said axis, a pair of substantially parallel horizontal pins, one on each side of said axis, and bodily slidable means for moving the last-named pins in a right line diametrically opposite each other and radially to said axis and in the same plane with each other and with said axis and toward and from said axis and into and out of the path of the revolving pins.

4. A candy pulling machine, comprising a pair of substantially parallel pins having a common axis, means for revolving said pins about said axis, a pair of pins substantially parallel with the revolving pins, and bodily slidable means for moving said pins in a right line diametrically opposite each other and radially to said axis and in the same plane with each other and with said axis and toward and from said axis and into and out of the path of movement of the revolving pins, the outward movement of the sliding pins being simultaneous.

5. A candy pulling machine, comprising a pair of substantially parallel pins having a common axis, means for revolving said pins about said axis, a pair of pins substantially parallel with the revolving pins, and bodily slidable means for moving said pins in a right line diametrically opposite each other and radially to said axis and in the same plane with each other and with said axis and toward and from said axis and into and out of the path of movement of the revolving pins, the inward movements of the sliding pins being simultaneous.

6. In a candy pulling machine, the combination of a frame-work, a horizontal revoluble main shaft journaled therein, a pair of crank arms on the end of said shaft, a pin projecting from each of said crank arms substantially parallel with said shaft, a pair of pins substantially parallel with the pins on the crank arms, and bodily slidable means for moving said last-named pair of pins in a right line diametrically opposite each other and radially to said main shaft and in the same plane with each other and with said shaft and toward and from each other into and out of the path of the crank pins.

7. In a candy pulling machine, the combination of a frame work, a horizontal revoluble main shaft journaled therein, a pair of crank arms on the end of said shaft, a pin projecting from each of said crank arms substantially parallel with said shaft, a main gear wheel on the shaft, a gear wheel on each side of the main gear wheel and meshing therewith, a crank pin on each of the side gear wheels, bars slidable in the framework, connections between the last named crank arms and the slidable bars, pins substantially parallel with the first named pins carried by said slidable bars, and means for sliding the bars radially toward and from the main shaft.

8. In a candy pulling machine, the combination of a frame work, a horizontal shaft, crank arms on the shaft, pins on the crank arms parallel with the shaft, a slideway at a right angle to the shaft, slide bars in said slideway on opposite sides of the shaft, pins on said slide bars parallel with the shaft, means for rotating the pins on the crank arms continuously in a single path, and means for moving the slide bars with their pins radially toward and from the shaft.

9. In a candy pulling machine, the combination of a frame work, a horizontal shaft, crank arms on the shaft, pins on the crank arms parallel with the shaft, a slideway at a right angle to the shaft, slide bars in said slideway on opposite sides of the shaft, pins on slide bars parallel with the shaft, means for rotating the pins on the crank arms continuously in a single path, and means for moving the slide bars with their pins radially toward and from the shaft, said movement of the pins on the slide bars being laterally, in a single horizontal plane and into and out of the path of movement of the pins on the crank arms.

In testimony whereof I affix my signature in presence of two witnesses.

HENRY S. BREWINGTON.

Witnesses:
SAMUEL W. KIRK,
HOWARD D. ADAMS.